UNITED STATES PATENT OFFICE.

HENRY PH. WEIDIG, OF NEWARK, NEW JERSEY, ASSIGNOR TO JOHN B. STOBAEUS AND JACOB KLEINHANS, OF SAME PLACE.

DISINFECTANT.

SPECIFICATION forming part of Letters Patent No. 497,082, dated May 9, 1893.

Application filed September 27, 1892. Serial No. 447,014. (No specimens.)

*To all whom it may concern:*

Be it known that I, HENRY PH. WEIDIG, a citizen of the United States, and a resident of Newark, in the county of Essex and State of New Jersey, have invented a new and useful Improvement in Disinfectants, of which the following is a specification.

My invention relates to a new and very effective disinfectant consisting of a solution of bromine and an oxygen salt, such as permanganate of potassium, the acid of which when liberated by hydrobromic acid will regenerate free bromine from the latter.

In carrying out my invention I add to a solution of twelve pounds of bromine in fifty gallons of water, about six pounds of permanganate of potassium, and accelerate the solution by shaking in a revolving barrel or by other suitable means. The solution is then put up in stone jars or in other suitable vessels, so as not to be exposed to the action of light.

My invention is not confined to the proportions of materials above mentioned.

Bromine is a very powerful oxidizer and will in watery solution form hydrobromic acid and oxygen when exposed to sunlight or in presence of organic matter; the reaction being as follows:

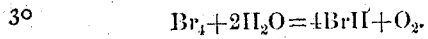

With the formation of hydrobromic acid the oxidizing or disinfecting power of bromine is exhausted, but by the presence in the solution of a salt, such as permanganate of potassium, or other permanganates, or chlorates, part of the bromine is regenerated and ready for renewed action as an oxidizer or disinfectant, the reactions being as follows:

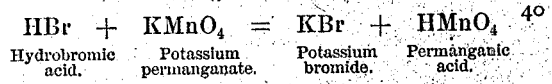

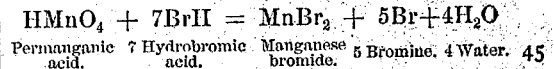

Thus out of eight atoms of bromine five atoms are regenerated as free bromine ready for renewed action in presence of organic matter, and so on until the whole of the bromine is transformed into bromides of potassium and of manganese.

While owing to its cheapness I use by preference permanganate of potassium as a regenerator of bromine, other regenerating oxygen salts may be used.

What I claim as new, and desire to secure by Letters Patent, is—

1. A disinfectant consisting of a solution of bromine and a bromine regenerating oxygen salt, such as a permanganate of potassium.

2. A disinfectant consisting of a solution of bromine and permanganate of potassium.

In testimony that I claim the foregoing as my invention I have signed my name, in presence of two witnesses, this 24th day of September, 1892.

HENRY PH. WEIDIG

Witnesses:
JOHN B. STOBAEUS,
PAUL EMIL GERHARDT.